April 24, 1934.   W. H. RICHARDS   1,955,770
UNIVERSAL CAMERA MOUNT
Filed March 30, 1933   2 Sheets-Sheet 1

INVENTOR
WILLIAM H. RICHARDS
BY Francis H. Vanderwerker and Wade Koontz
ATTORNEYS April 24, 1934.   W. H. RICHARDS   1,955,770
UNIVERSAL CAMERA MOUNT
Filed March 30, 1933   2 Sheets-Sheet 2
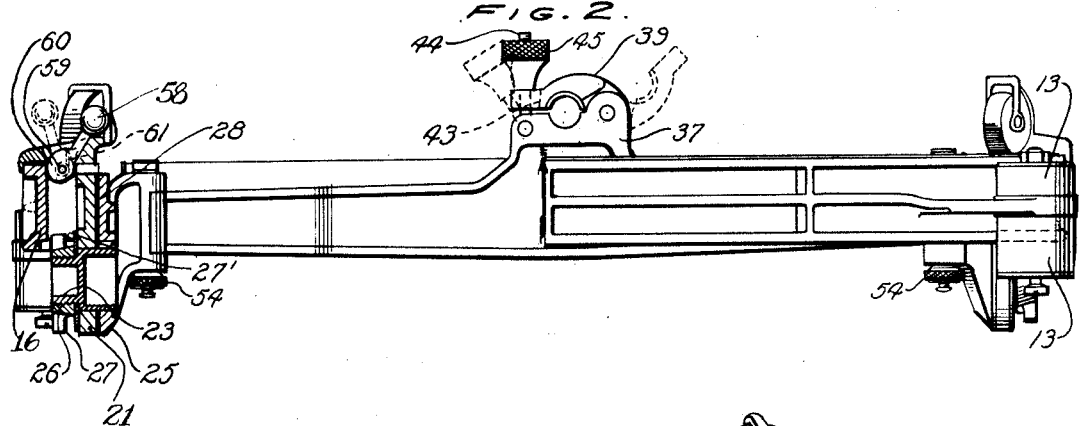
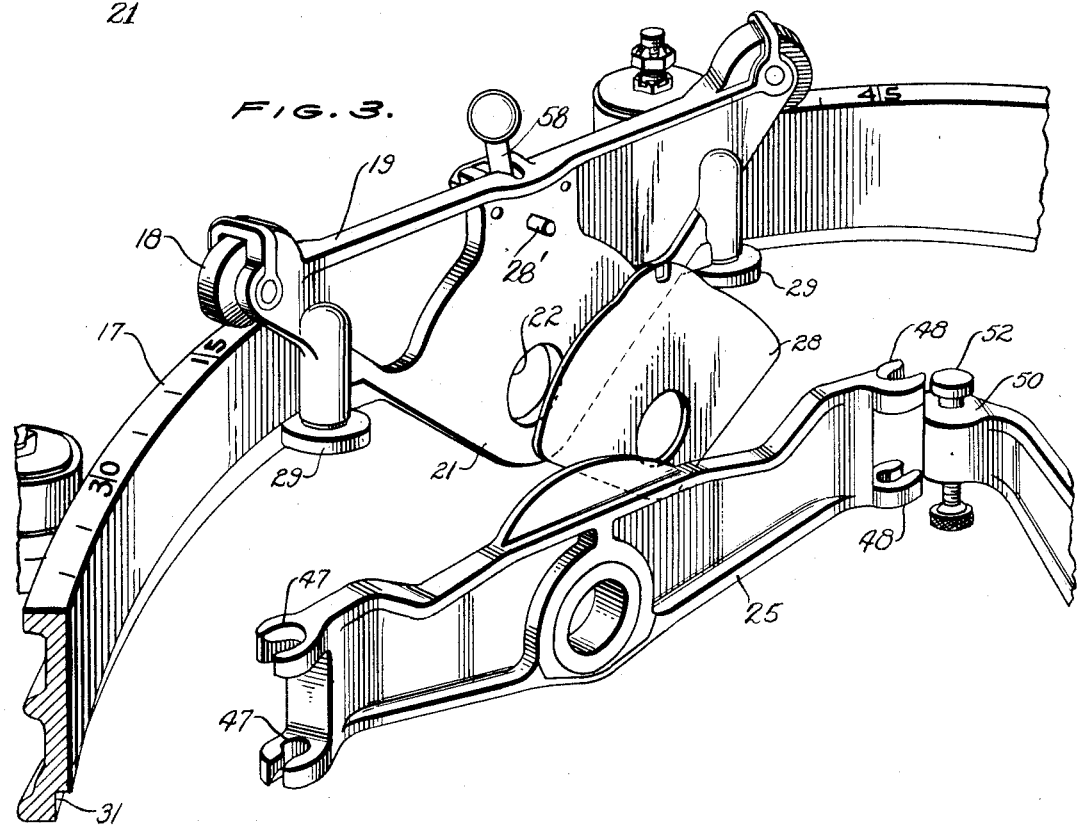
INVENTOR
WILLIAM H. RICHARDS
ATTORNEYS Patented Apr. 24, 1934

1,955,770

UNITED STATES PATENT OFFICE 1,955,770

UNIVERSAL CAMERA MOUNT

William H. Richards, Dayton, Ohio

Application March 30, 1933, Serial No. 663,556

11 Claims. (Cl. 95—12.5)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to photography and more particularly to apparatus for mounting an aerial camera so that the optical axis of the camera can be kept substantially vertical.

In photographing from an airplane it is desirable to have the edges of the plate or film in some definite relation with respect to objects on the ground, as for example, parallel to streets or roads or to the line of flight. This is especially essential in taking a succession of photographs which are subsequently to be matched or joined together to make a map or composite view of a territory larger in extent than can be embraced in a single photograph. Those skilled in the art are well aware of the fact that if the nose of an airplane can be kept head-on with respect to the line of travel or motion of the plane with respect to the ground the problem would present no difficulty and under these circumstances it would only be necessary for the pilot to maintain his course in order to obtain the desired photographs, but when the line of flight is in any material degree transverse to the wind the plane usually crabs, that is, it moves more or less sidewise or drifts with respect to the ground. Under such circumstances if the camera is incapable of horizontal rotative adjustment, the photographer has little or no control over the position of the plate or film with respect thereto, but must depend primarily on the skill of the pilot in keeping the plane to its proper course and eliminate, if possible, the tendency of the plane to drift by approaching the territory it is desired to photograph in a line up or down wind.

The types of cameras now in use vary a great deal in size and shape depending not only upon the design of the particular make of camera, but also upon the particular purpose for which the camera is intended to be used. This is especially true in the case of cameras designed for military use when it is essential that as great an area be photographed as possible at each exposure at high or low altitudes and at varying rates of speed. Cameras of the type referred to are usually mounted in gimbal rings or gimbal frames so that the optical axis of the camera can be maintained substantially vertical at all times. Heretofore it has been necessary to provide a camera mount in which the gimbal rings were intended for use with a particular camera only and very little if any attention or consideration was given the necessary cost involved in providing a gimbal ring for each type of camera used.

It is accordingly the primary object of the present invention to provide for a camera a universal mount which is simple and effective in character and of compact construction, which is readily adapted for use with any type camera and which may be easily and readily manipulated.

A further object of the present invention is to provide in a camera mount of this character a gimbal ring or frame having readily replaceable or interchangeable portions or adapter arms provided with supports for carrying the camera which is constructed and arranged so that any type of camera may be used merely by replacing one set of adapter arms with the particular set of arms intended for use with a particular camera. A great saving in cost is thereby effected as well as a saving in time in that the adapter arms may not only be manufactured at slight cost as compared with the cost incident to providing a different mounting for every type of camera used, but are readily replaceable by other sets of arms in a short period of time.

A further object of the present invention is to provide in a camera mount of this character a freely rotatable gimbal ring support including means for readily and effectively locking or unlocking the gimbal ring against rotation or permitting its rotation to properly align the edges of the plate or film of the camera with any ground object such as a street or road so that the photographer can better center his attention on the manipulation of the camera controls.

A still further object of the present invention is to provide in a camera mount of this character means for indicating the angular relation of the edges of the plate or film with respect to the line of flight or in some definite relation to the points of the compass so as to afford a proper check for errors when the plates or films are being developed.

To these and other ends the invention resides in certain improvements and combinations of parts as will be hereinafter more fully described, the novel features being pointed out in the appended claims.

In the drawings:

Fig. 2 is a quarter-sectional side view taken along the line 2—2 of Fig. 1; and

Figure 1:
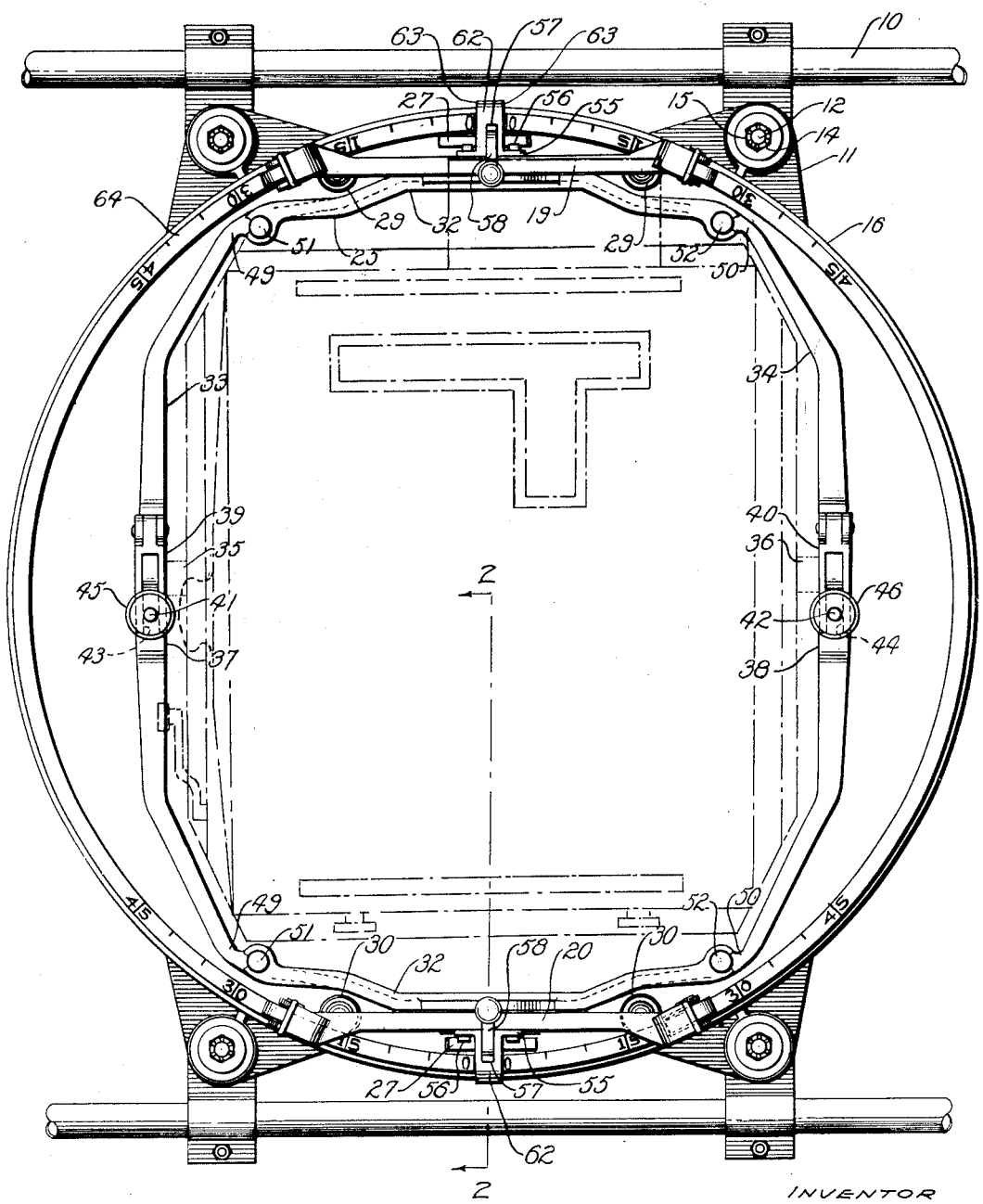
Fig. 1 is a top plan view of a preferred embodiment of my invention.

Fig. 3 is an enlarged detail view in perspective of the parts in an exposed position Referring more particularly to the drawings wherein corresponding parts are designated by like numerals throughout the several views thereof, the numeral 10 represents any suitable supporting members or frame carried by or forming part of an airplane. From these members the entire camera assembly illustrated is removably supported by means of the lugs 11 and machine screws 12, the former being provided with thick rings 13 composed of soft rubber or other suitable yielding material held firmly in place by means of the machine screws 12, washers 14 and nuts 15. These supporting lugs are disposed in spaced relation about the periphery of an annular ring-shaped support 16. The function of the rubber cushion rings is to absorb vibrations and other slight shocks to which the airplane may be subjected and thus prevent the same from affecting the camera.

As will be noted by referring to Figs. 1 and 3, the support 16 is formed with a top flanged portion 17 forming a circular track the purpose of which is to provide a raceway for the rollers 18 of the gimbal frame carriers 19 and 20, which are oppositely disposed in the gimbal frame longitudinally with respect to the fuselage. Each of these carriers is of a truck type, the carrying rollers 18 of which are disposed in pairs diametrically opposite to each other, as shown in Fig. 1. Intermediate each pair of rollers the carrier is formed with a downwardly extending bearing portion 21, each portion having an opening 22 provided therein adapted for receiving bearings 23, which are fixedly secured in the end portion of the gimbal frame generally indicated by the numeral 25. As shown in Fig. 2, the bearings 23 are formed with an outwardly extending threaded portion 26, upon which is adapted to be secured a manually operated hand knob 27, the inner face 27' of which is adapted to contact against the surface of the bearing portion 21, as shown in Fig. 2, and thus control the ease with which the gimbal frame will rotate in the carriers. The material of which the support 16 and gimbal frame 25 is formed is usually a soft material such as aluminum by reason of its light weight and for this reason it is necessary that a washer of steel material, indicated by numeral 28, be inserted intermediate the bearing face 21 of the support 16 and the gimbal frame 25 so that the parts referred to may be rotated relative to one another without creating any binding action therebetween. This washer is provided with a slot at its upper end within which engages a pin 28' to prevent the washer from turning when the gimbal frame is moved.

The carriers 19 and 20 are each provided with pairs of centering rollers indicated by numerals 29 and 30, which are adapted to operate in an internal annular flange 30 provided in the lower end of the support 16, as is shown in Fig. 3.

The gimbal frame 25 heretofore mentioned by reason of this construction is capable of rotating upon an axis which is longitudinally disposed with respect to the fore-and-aft axis of the airplane to permit a camera when mounted therein to be tilted transversely with respect to the aforementioned axis.

This gimbal frame comprises the end portions 32 and side portions 33 and 34. These side portions serve the purpose of supporting the camera in the gimbal frame. In this instance the camera is usually provided with oppositely disposed arms 35 and 36 and pivots about which the camera is rotatable. These camera pivots are in line with each other and are disposed 90° from the gimbal ring pivots or the pivots provided in the end portions 32 so that no matter in what direction the airplane may tilt the camera axis can remain or be maintained in the vertical position. The side portions 33 and 34 of the gimbal frame hereinabove referred to as adapter arms are each provided with bearing portions consisting of a lower leaf 37 and 38 integral with the arms 33 and 34 and an upper leaf 39 and 40 pivoted on the lower, screws 41 and 42 being pivotally secured to the lower leaf of each arm, which are adapted to swing into and out of recesses 43 and 44 provided in the free end of each upper leaf and a thumb nut 45 and 46 on the screw to hold the upper leaf lightly on the camera pivots. At any time, however, the camera may be lifted out of the gimbal frame merely by opening the pivoted clamps, as shown in dotted position in Fig. 2.

The adapter arms 33 and 34 are made in pairs, any number of sets of which may be provided to suit the type of camera it is desired to use and for this purpose are readily removable from the end portions 32 of the gimbal frame. With this purpose in mind the end portions of the gimbal frame are forked, as illustrated in Fig. 3, the latter being provided with slotted openings, 47 and 48 adapted for receiving the ends 49 and 50 of the adapter arms 33 and 34. These end portions are provided with locking screws 51 and 52, which are received in the slotted openings formed in the forked end of the gimbal frame, thumb screws 53 and 54 being provided to lock the ends of the adapter arms snugly within the forked ends of the gimbal frame.

The carriers 19 and 20 are each provided with a locking device so that the gimbal frame may be locked in any angular position with respect to its support. These locking devices are similar in construction and therefore a description of the one will suffice for both. As best shown in Fig. 2, each locking device comprises a bracket 55, which is secured to the ends of the carriers by means of machine screws 56, each bracket being slotted as indicated by numeral 57, within which is adapted to be received a locking member 58. This locking member is pivotally mounted on a pin 59, which is carried by the bracket 55. The locking member 58 is provided with a cam-shaped portion 60, which is adapted to lockingly engage with the inner upper edge of the support 16 when the locking member is in the position illustrated in dotted outline in Fig. 2, this being the normal position assumed by the locking member. A spring 61 is provided to maintain the locking member normally locked. When it is desired to rotate the gimbal frame with respect to its support it is only necessary to manually move the locking member inward to the full line position illustrated in Fig. 2, so that the gimbal frame may be freely rotated in order to properly align the edge of the plate or film of the camera with any ground object.

As shown in Fig. 1, each bracket is formed with a portion 62, which is adapted to overhang the top circular flanged portion 17 formed on the support 16, the sides 63 of which form an index which is adapted to cooperate with a scale 64 calibrated in units of degrees provided on the top flange portion 17 of the support so that when the gimbal frame is angularly rotated with respect to its support its angular position with respect to the latter may be readily ascertained.

It is to be understood that the invention is not limited to the construction herein specifically illustrated and described, but may be embodied in other forms without departing from the spirit of the invention.

I claim:

1. In an apparatus for mounting aerial cameras, a gimbal ring for encircling said camera, pivotal connections between the camera and gimbal frame at opposite sides thereof to permit the camera to swing in the frame on a transverse axis, a truck type carrier for the frame, pivotal connections between the carrier and the frame to permit the frame to swing on an axis at right angles to the first-mentioned axis and a support for said carrier including a top flanged portion forming a circular track, said carrier being provided with rollers adapted to track on the top flange portion of said support and permit said carrier to be readily rotatable horizontally.

2. In an apparatus for mounting aerial cameras, a gimbal ring for encircling said camera, pivotal connections between the camera and gimbal frame at opposite sides thereof to permit the camera to swing in said frame on a transverse axis, a truck type carrier for the frame, pivotal connections between the carrier and frame to permit the frame to swing on an axis at right angles to the first-mentioned axis, a support for said carrier on which the latter is rotatably mounted, and means for locking said carrier against rotation relative to said support.

3. In an apparatus for mounting aerial camers, a gimbal frame for encircling said camera, pivotal connections between the camera and gimbal frame at opposite sides thereof to permit the camera to swing in said frame on a transverse axis, a truck type carrier for the frame, pivotal connections between the carrier and the frame to permit the frame to swing on an axis at right angles to the first-mentioned axis, a support for said carrier on which the latter is rotatably mounted, and spring actuated means for automatically locking said carrier against rotation relative to said support.

4. In an apparatus for mounting aerial cameras, a gimbal frame for encircling said camera, pivotal connections between the camera and gimbal frame at opposite sides thereof to permit the camera to swing in said frame on a transverse axis, a truck type carrier for the frame, pivotal connections between the carrier and the frame to permit the frame to swing on an axis at right angles to the first-mentioned axis, a support for said camera on which the latter is rotatably mounted to permit said frame to be angularly moved with respect to the support, means for locking said carrier against rotation relative to said support and means for indicating the angular position of said frame with respect to said support.

5. In an apparatus for mounting aerial cameras, a gimbal frame for encircling said camera, pivotal connections between the camera and gimbal frame at opposite sides thereof to permit the camera to swing in said frame on a transverse axis, a truck type carrier for the frame, pivotal connections between the carrier and the frame to permit the frame to swing on an axis at right angles to the first-mentioned axis, a support for said carrier on which the latter is rotatably mounted, and means for locking said carrier against rotation relative to said support, said locking means comprising a manually operated cam-shaped member pivotally connected to said carrier adapted when moved in one direction to frictionally engage said support.

6. In an apparatus for mounting aerial cameras, a gimbal frame for encircling said camera, pivotal connections between the camera and the gimbal ring at opposite sides thereof to permit the camera to swing in said frame on a transverse axis, a truck type carrier for the frame, pivotal connections between the carrier and the frame to permit the frame to swing on an axis at right angles to the first-mentioned axis, a support for said carrier on which the latter is rotatably mounted, and means for locking said carrier against rotation relative to said support, said locking means comprising a manually operated spring controlled member pivotally connected to said carrier and having a cam-shaped portion adapted when moved outwardly by spring pressure to frictionally engage the side of said support.

7. In an apparatus for mounting aerial cameras, a gimbal frame for encircling said camera, pivotal connections between the camera and gimbal frame at opposite sides thereof to permit the camera to swing in said frame on a transverse axis, a truck type carrier for the frame, pivotal connections between the carrier and the frame to permit the frame to swing on an axis at right angles to the first-mentioned axis, a support for said camera on which the latter is rotatably mounted to permit said frame to be angularly moved with respect to the support, means for locking said carrier against rotation relative to said support, and means for indicating the angular position of said frame with respect to said support, said last-mentioned means including an index carried by said carrier adapted for movement over a scale provided on said support.

8. In an apparatus for mounting aerial cameras, a gimbal frame for encircling said camera, pivotal connections between the camera and the gimbal frame at opposite sides thereof to permit the camera to swing in the frame on a transverse axis, a truck type carrier for the frame, pivotal connections between the carrier and frame to permit the frame to swing on an axis at right angles to the first-mentioned axis and a support for said carrier including a top flanged portion forming a circular track and an internal annular flanged portion, said carrier being provided with a set of rollers adapted to track on the top flanged portion of said support and a second set of rollers adapted to roll on said internal annular flanged portion to center said frame with respect to said support.

9. A universal camera mount comprising, a circular support having a top flanged portion forming a circular track, a fabricated gimbal frame for encircling a camera, oppositely disposed pivotal connections between the camera and said portions of said gimbal frame to permit the camera to swing in the frame on a transverse axis, a rotatable truck type carrier provided with rollers adapted for rotation on the circular flanged portion of said support, pivotal connection between the gimbal frame and carrier to permit said frame to swing on an axis at right angles to said first-mentioned axis, the side portions of said gimbal frame being readily removable therefrom.

10. A universal camera mount comprising, a support, a gimbal frame for encircling a camera pivotally mounted on said support on an axis longitudinally disposed with respect thereto, said gimbal frame including removable side portions provided with bearings within which said camera is pivotally mounted to permit said camera to swing on an axis transversely to said first-mentioned axis.

11. A sectional gimbal frame for an aerial camera including end portions adapted for being pivotally connected to a support on a longitudinal axis, and side portions removably secured to said end portions, said side portions being provided with bearings within which an aerial camera is capable of being pivotally mounted for swinging movement on an axis at right angles to said first-mentioned axis.

WILLIAM H. RICHARDS.